(12) United States Patent
Hobson et al.

(10) Patent No.: US 7,210,139 B2
(45) Date of Patent: *Apr. 24, 2007

(54) PROCESSOR CLUSTER ARCHITECTURE AND ASSOCIATED PARALLEL PROCESSING METHODS

(76) Inventors: Richard F. Hobson, 3019 Armada Street, Coquitlam (CA) BC V3S 3S4; Bill Ressl, Apt. 9C, 139 Drake Street, Vancouver (CA) BC V6Z 2T8; Allan R. Dyck, 1175 Victory Drive, Port Moody (CA) BC V3H 1K3

( * ) Notice: Subject to any disclaimer, the term of this patent is extended or adjusted under 35 U.S.C. 154(b) by 0 days.

This patent is subject to a terminal disclaimer.

(21) Appl. No.: 11/255,597

(22) Filed: Oct. 20, 2005

(65) Prior Publication Data

US 2006/0129777 A1    Jun. 15, 2006

Related U.S. Application Data

(63) Continuation of application No. 10/369,182, filed on Feb. 18, 2003, now Pat. No. 6,959,372.

(60) Provisional application No. 60/358,133, filed on Feb. 19, 2002, provisional application No. 60/358,290, filed on Feb. 19, 2002.

(51) Int. Cl.
*G06F 9/45* (2006.01)

(52) U.S. Cl. ........................... 717/149; 712/213

(58) Field of Classification Search ................ None
See application file for complete search history.

(56) References Cited

U.S. PATENT DOCUMENTS

| 3,537,074 A | * | 10/1970 | Sankin et al. ................ 712/14 |
| 5,121,498 A | * | 6/1992 | Gilbert et al. .............. 717/149 |
| 2005/0033941 A1 | * | 2/2005 | Joyce et al. ............... 712/213 |

* cited by examiner

*Primary Examiner*—Brian R. Peugh
(74) *Attorney, Agent, or Firm*—Berkeley Law & Technology Group, LLP

(57) ABSTRACT

A parallel processing architecture comprising a cluster of embedded processors that share a common code distribution bus. Pages or blocks of code are concurrently loaded into respective program memories of some or all of these processors (typically all processors assigned to a particular task) over the code distribution bus, and are executed in parallel by these processors. A task control processor determines when all of the processors assigned to a particular task have finished executing the current code page, and then loads a new code page (e.g., the next sequential code page within a task) into the program memories of these processors for execution. The processors within the cluster preferably share a common memory (1 per cluster) that is used to receive data inputs from, and to provide data outputs to, a higher level processor. Multiple interconnected clusters may be integrated within a common integrated circuit device.

9 Claims, 6 Drawing Sheets

EXAMPLES OF POSSIBLE CODE PAGE BOUNDARY LOCATIONS

PROCESSOR CLUSTER ARCHITECTURE AND ASSOCIATED PARALLEL PROCESSING METHODS

RELATED APPLICATIONS

This application is a continuation of U.S. application Ser. No. 10/369,182, filed Feb. 18, 2003, now U.S. Pat. No. 6,959,372 which claims the benefit of U.S. Provisional Appl. Nos. 60/358,133 and 60/358,290, both filed on Feb. 19, 2002, the disclosures of which are hereby incorporated by reference.

BACKGROUND OF THE INVENTION

1. Field of the Invention

The present invention relates to computer architectures for the parallel processing of data.

2. Description of the Related Art

The Multiple-Instruction Multiple Data (MIMD) parallel computer model is a general purpose model which supports different software algorithms running on different processors. If several of the processors are executing the same piece of software, there could be unnecessary duplication of program memory, or congestion related to fetching instructions from a common shared memory. Program memory caching is a common way to help alleviate this situation, but as the number of processors grows, the caching technique may become less effective. Instruction caching is also quite complex, tending to increase silicon area and processor power consumption. Systems-On-Chip (SOCs) have limited silicon area, processor speed, and power, and should avoid wasting any of these resources.

Some data manipulation algorithms lead one to consider the Single-Instruction Multiple-Data (SIMD) parallel computer model. This model assumes that most of the time the same computer instruction can be applied to many different sets of data in parallel. If this assumption holds, SIMD represents a very economical parallel computing paradigm. However, some complicated algorithms have many data dependent control structures which would require multiple instruction streams for various periods of time. Adding to this complication is the possible need to support multiple algorithms simultaneously, each of which may operate on a different set of (independent) data. Thus, large amounts of program memory may be needed.

SUMMARY OF THE INVENTION

The present invention provides a parallel processing architecture that offers a high level of performance without the need for large amounts of redundant program memory. In a preferred embodiment, a plurality of processors are coupled to a common code distribution bus to form a processor cluster. The code distribution bus is used to download or dispatch code pages (blocks of code) to the processors for execution—preferably from a common program memory. The processors are also coupled to a shared memory that is used to receive inputs (including data sets to be processed) and to provide outputs to other processing entities. A number of interconnected processor clusters may be integrated within a common integrated circuit device.

Each processor only needs enough program memory to store a single code page at a time. Typically, each processor has a local program memory that is between about 1K (1024) and 4K instructions in size. For processors that use four-byte instructions, this results in program memories of 4K to 16K bytes in size. Although each processor preferably has its own respective program memory, two or more processors may alternatively share a local program memory.

A program or task to be executed by the cluster is initially subdivided into multiple code pages by selecting appropriate boundary locations. The code page boundaries are preferably selected such that (1) each code page may be fully loaded into the program memory of one of the cluster's processors, (2) major program loops are fully contained within code pages (so that frequent code page "swaps" are not needed), and (3) execution of the program or task proceeds in a predictable order from one code page to the next.

The cluster of processors may optionally be subdivided into two or more groups ("task groups") for purposes of executing tasks. For example, a cluster of eight processors may be subdivided into two four-processor task groups, one of which continuously executes a first task and the other of which continuously executes a second task. The tasks may, for example, include voice processing algorithms that are continuously applied in real time to voice channels, although other applications are possible. The processors within a task group execute code pages in parallel, and each such processor typically processes a different set or collection of data. Task groups may also be formed that include processors from multiple clusters.

In operation according to one embodiment, a task control processor broadcasts a code page over the code distribution bus to all processors within a task group. This code page is stored within the respective program memories of each of the processors in the task group, and each such processor executes the code page from its respective memory. Once all processors within the task group have finished executing the code page, the task control processor broadcasts the next code page of the assigned task to these processors for execution. Execution of the task proceeds in this manner until all code pages of the task have been executed, at which point the task may be repeated (applied to a new data set) or terminated. In some cases, a single code page may be adequate for a complete task, so that once execution starts there is no need to load additional pages.

One aspect of the invention is thus a parallel processing architecture comprising a plurality of processors that share a common code distribution bus. Pages or blocks of code are concurrently loaded into respective program memories of these processors over the code distribution bus, and are executed in parallel by the processors. The plurality of processors may, but need not, be a subset of a larger cluster of processors that share a common code distribution bus. The plurality of processors preferably share a common memory (1 per cluster) that is used to receive data inputs and to provide data outputs. A task control processor preferably detects when all of the plurality of processors have finished executing the code page, and then loads a new code page (e.g., the next sequential code page within a task) into the processors' respective memories for execution.

Another aspect of the invention is a method for subdividing a task (code sequence) into a plurality of code pages to be executed by one or more processors within a cluster (or spread across multiple clusters). The task is preferably subdivided into code pages such that the code pages may be loaded and executed in an order that is known prior to execution. In addition, each code page is preferably sufficiently small in size to fit within a program memory of a processor of the cluster. Any program loops of the task are preferably fully contained within the code pages, such that execution proceeds sequentially from one code page to the next when the task is executed.

Yet another aspect of the invention is an architecture that supports the ability for processors within a cluster to be assigned or allocated to tasks to form two or more task groups. Preferably, each processor includes a task ID register that may be loaded with a task number. When a code page is broadcast on the code distribution bus in association with a particular task, all processors assigned to that task (e.g., all processors having the corresponding task number in their respective task ID registers) respond by receiving and executing the code page.

Neither this summary nor the following detailed description section is intended to define the invention. The invention is defined by the claims.

BRIEF DESCRIPTION OF THE DRAWINGS

The above and other features of the invention will now be described with reference to the drawings summarized below. These drawings and the associated description are of a preferred embodiment of the invention, and are not intended to limit the scope of the invention.

DETAILED DESCRIPTION OF PREFERRED EMBODIMENTS

Figure 1:
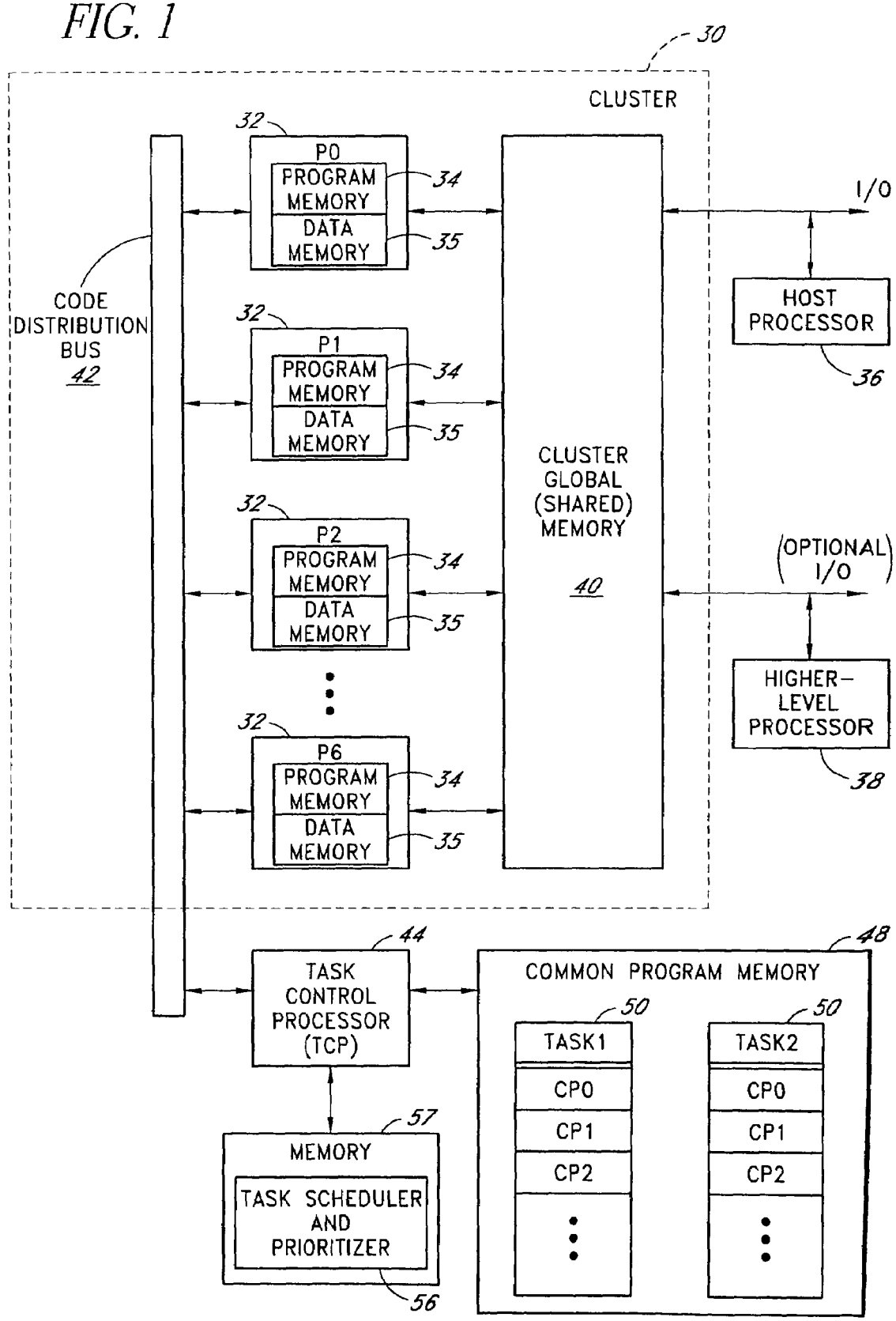
FIG. 1 illustrates a processor cluster architecture according to one embodiment of the invention.

FIG. 1 illustrates a parallel processing architecture according to one embodiment of the invention. This architecture combines some of the best features of SIMD, MIMD, and multitasking, and takes into account the need for modularity in System-On-Chip (SOC) products. As will be apparent, the architecture is particularly well suited for processing multiple instances of independent data streams or sets. Examples of applications for which the architecture may be used include voice channel processing, multi-channel data encryption, and 3G wireless base station receiver/transmitter functions.

As illustrated, the architecture comprises a cluster 30 of processors 32 (P0–P6), each of which has its own local program memory 34, local data memory 35, and a shared cluster global memory 40. Multiple clusters 30 of this type may be provided within a single SOC or other silicon device. For example, as described below with reference to FIG. 6, multiple clusters 30 may be arranged and interconnected in a hierarchy within a single integrated circuit device.

The processors 32, which may be referred to as "cluster processors," preferably access a cluster global memory 40 that is used to communicate with other entities, such as a host processor 36 or other higher-level processors 38 that control the overall operation of the cluster 30. The global memory's interface is shown with nine ports, seven for the cluster processors P0–P6 and two for input/output (I/O). Although seven cluster processors 32 are shown in this example, a greater or lesser number (L) of processors 32 (typically between 4 and 12) may be used per cluster 30. In addition, the global memory's interface may include additional higher-level processors 38.

As illustrated, each cluster processor 32 is coupled to a common code distribution bus 42. This bus 42 is used to dispatch "code pages," or short sequences of code, to individual processors 32 for execution. The code page being executed by a given processor 32 is stored within that processor's local program memory 34. Each local program memory is typically only large enough to hold a single code page at a time. As described below, an important aspect of the design is that a code page may be dispatched to (loaded into the local program memories 34 of) multiple cluster processors 32 at one time.

Although each processor 32 is shown as having its own local program memory 34, a single local program memory 34 may alternatively supply instructions to two or more cluster processors 32, thereby conserving even more silicon. To avoid performance loss, such a memory would preferably deliver instructions at two or more times the normal rate, such as by fetching two or more instructions at a time.

The task of dispatching the code pages to the processors 32 is performed by a task control processor (TCP) 44. The cluster processors 32, the task control processor 44, the host processor 36, and the higher-level processors 38, may be Pipelined Embedded Processors (PEP™) as described in Hobson et al, "An Embedded-Processor Architecture for Parallel DSP Algorithms," Advanced Signal Processing Algorithms, Architectures, and Implementation Conference, Denver Colo., Aug. 1996, pp. 75–85, the disclosure of which is incorporated herein by reference. Other types of microprocessors may additionally or alternatively be used.

The task control processor 44 dispatches code pages to the processors 32 by reading the code pages from a common program memory 48, and broadcasting these code pages one-at-a-time on the code distribution bus 42. As illustrated in FIG. 1, the code pages are stored in the common program memory 48 in sequences (CP0, CP1, . . . ), where each sequence of code pages represents a program or task 50 that is executed by the cluster processors 32. In one embodiment, the common program memory 48 is located on the same chip as the various processors 32, 36, 38, 44. In other embodiments, the common program memory may be off chip, or there may be both on and off chip memories for program code.

Figure 6:
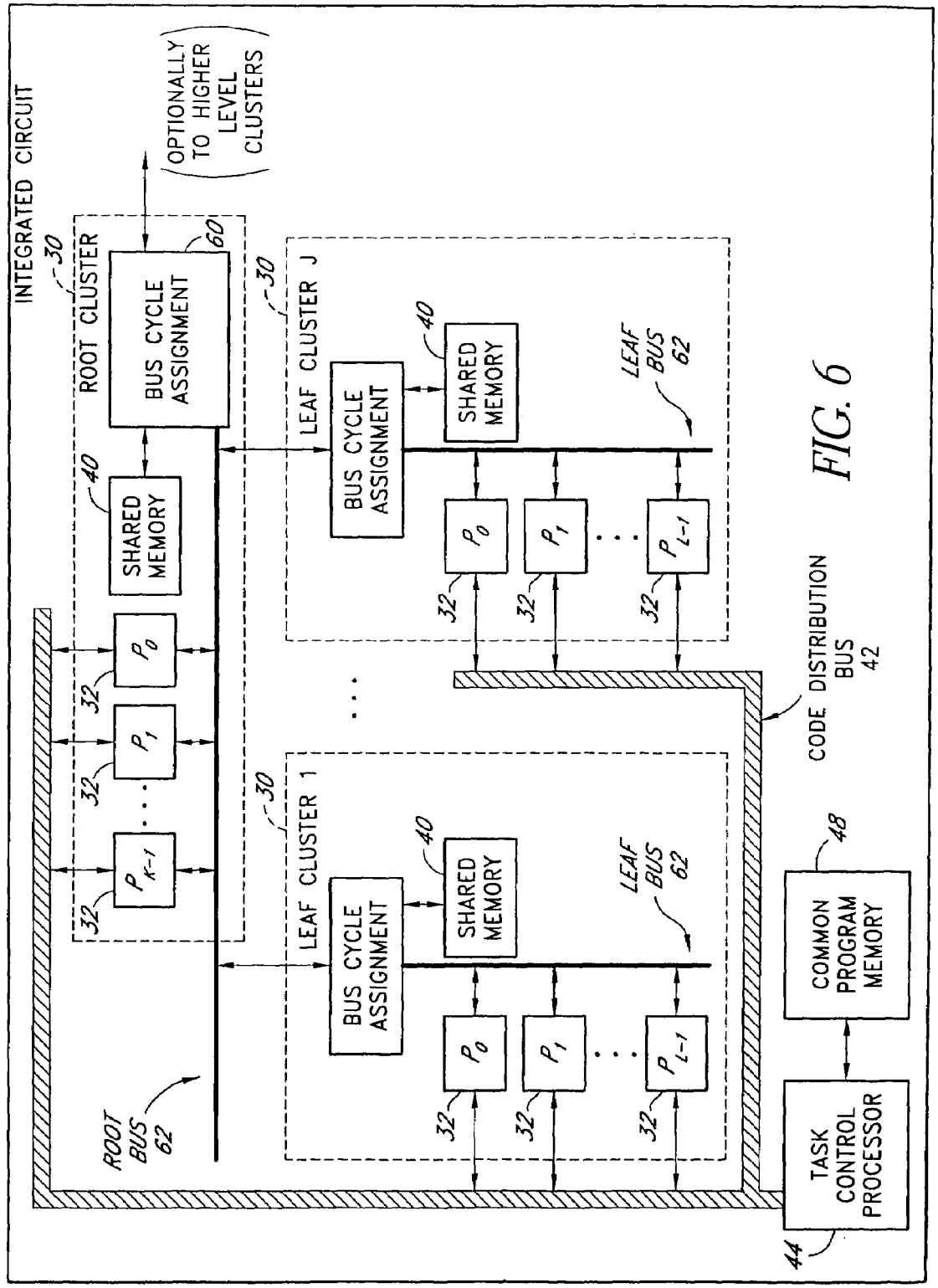
FIG. 6 illustrates how multiple processor clusters of the type shown in FIG. 1 may be arranged hierarchically within an integrated circuit.

A single task control processor 44, code distribution bus 42, and common program memory 48 may be used to dispatch code pages to the cluster processors 32 of many different clusters 30, such as all clusters on a single SOC device (see FIG. 6). Alternatively, one or more additional task control processors 44, code distribution buses 42, and common program memories 48 may be provided within a given IC device to reduce loading.

In one embodiment, each processor 32 is suspended while code pages are being loaded into its program memory 34. In another embodiment, the processors 32 are able to continue execution while code pages are being loaded into their program memories 34. This may be accomplished by splitting the program memory 34 into two parts so that the processor can execute from one part while the other part is being re-loaded. The parts may be different in size.

A given code page may be simultaneously dispatched over the code distribution bus 42 to any number of cluster processors 32 for execution. Specifically, the task control processor 44 may broadcast a given code page on the code distribution bus 42 to concurrently load that code page into the local program memories 34 of some or all of the cluster's processors 32, and possibly into the local program memories of processors 32 within other clusters 30. In the preferred embodiment, a code page transmitted on the code distribution bus 42 will be loaded into local program memories 42 of all cluster processors 32 assigned to the corresponding task 50. The group of processors 32 assigned to a particular task 50 (or possibly to a set of tasks) is referred to as a "task group." A given task group may, but need not, span (include processors from) multiple clusters 30. As described below, each cluster processor 32 may be programmed with an identifier that specifies the task or task group to which it is currently assigned.

After a code page has been stored in each participating processor's respective program memory 34, the processors 32 asynchronously execute the code page to completion—typically to process their own respective data set or sets. Once all processors 32 within the task group have finished executing a code page, the task control processor 44 broadcasts the next sequential code page of the assigned task to these processors 32 for execution. Execution of the task proceeds in this manner until all code pages of the task have been executed, at which point the task may be repeated (applied to new data sets) or terminated.

As mentioned above, each code page is typically a subset or block of a larger algorithm or program 50 being executed by a task group. To efficiently use the illustrated architecture, the program is preferably divided into code pages so as to achieve the following properties: (1) program loops are permitted as long as they are contained within respective code pages; (2) each code page is executed only a few times (and ideally once) per data set, (3) program execution proceeds sequentially (in a predictable order) from one code page to the next. Property (1), which may be relaxed in some cases, e.g. by loop unrolling, allows each code page to be executed to completion before it is replaced within the relevant processor's program memory 34. The optimum code page size used to subdivide a program 50 is a design parameter that typically varies from program to program.

The size of the local program memories 34 may be selected based on the optimum memory sizes for the different applications that will be executed by the cluster. Since different applications typically have different optimum memory sizes, a compromise may be appropriate in which the program memories are selected to be slightly smaller than or equal to the largest optimum memory size.

The sizes of the local data memories 35 may be selected based on the amount of execution state information that will be stored, as well as the number of independent data sets that will be kept in whole or in part. The latter depends on how many data sets a processor 32 can manage in real-time. Although the illustrated embodiment uses separate local memories 34, 35 for program code versus data (as is the case for a Harvard architecture), a shared local memory may alternatively be used.

An important benefit of the foregoing method of subdividing the program is that it allows relatively small local program memories 34 to be used (e.g., 1K to 4K instructions, and more typically 1.5K to 2.5K instructions; or about 4K to 16K bytes). Specifically, because the code pages are ordinarily executed to completion and in a predetermined order, program memories large enough to hold only a single code page at a time may be used without realizing a significant performance penalty. Some processors 32 may optionally have larger program memories 34 than others to accommodate relatively large code pages.

By using small program memories, the present architecture captures the essence of SIMD. SIMD architectures are considered "fine grain" by computer architects because they have minimal resources but replicate these resources a large number of times. As mentioned above, this technique can be a very effective way to harness the power of parallelism. The present parallel architecture is efficient for both multiple tasks and multiple data sets, but remains as "fine grain" as possible.

The ability to divide a program into code pages, as set forth above, is possible for reasons similar to those that enable modern computers to commonly use program and data caches which exploit the properties of temporal and spatial locality. Sequential execution of an instruction sequence demonstrates spatial locality, while having loops embedded within a short piece of code demonstrates temporal locality.

Task Control

Figure 2:
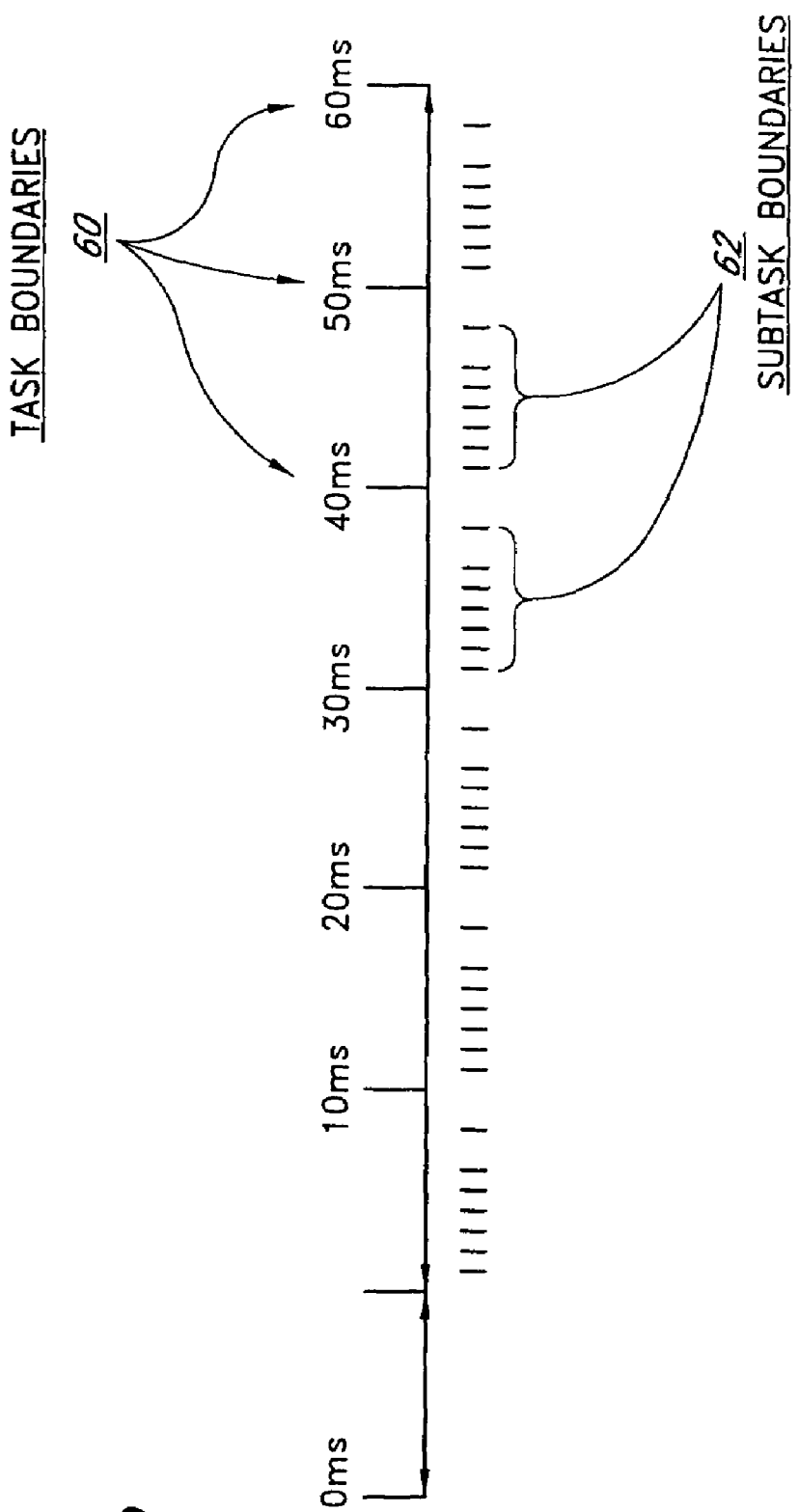
FIG. 2 illustrates example task and code page transitions during program execution.

As described above, each code page generally represents a portion of a larger program or task 50 being executed. FIG. 2 illustrates example task boundaries 60 and code page (subtask) boundaries 62 as a group of cluster processors 32 execute tasks. The markings at the code page boundaries 62 represent the time needed (not drawn to scale) to load a new code page into the program memories 34 of the group of processors 32. If a 200 MHz code distribution bus 42 is used (resulting in two million cycles per 10 ms interval), and each code page is 1024 (1K) instruction words long, the number of clock cycles needed to load a code page is 1024+ overhead clock cycles. If overhead is 100%, about 2048 clock cycles are needed. Ten blocks (code pages) use up 20,480 cycles or about 1% of one 10 ms interval.

It is also possible for one processor 32 to operate on several independent data sets. This may be accomplished either by reloading all code pages for each data set, or by structuring each code page to process several data sets. The latter usually requires more local data memory 35 to store intermediate information, so the former is preferred if time permits (a time-space tradeoff). If a set of code pages is repeated for four data sets, the aforementioned overhead increases to about 4% of available time. Every application will typically have different parameters, but some small amount of time should be budgeted for this task swap method (e.g. 4–15%). In the preferred embodiment, data sets are initialized when the power is turned on, and are maintained by code pages as they execute in real-time. In some embodiments, it may be possible to change the number of data sets as the system runs.

One factor to consider is that code swapping for different tasks is typically interleaved over the same code distribution bus 42. Thus, the markings 62 in FIG. 2 could be shown in different colors, each color representing a different task. Tasks that are not in code swap mode can continue to run. A second factor is that some data manipulation algorithms take more time than others. Due to these complexities, it may be desirable to run a simulation for each task mix.

Figure 4:
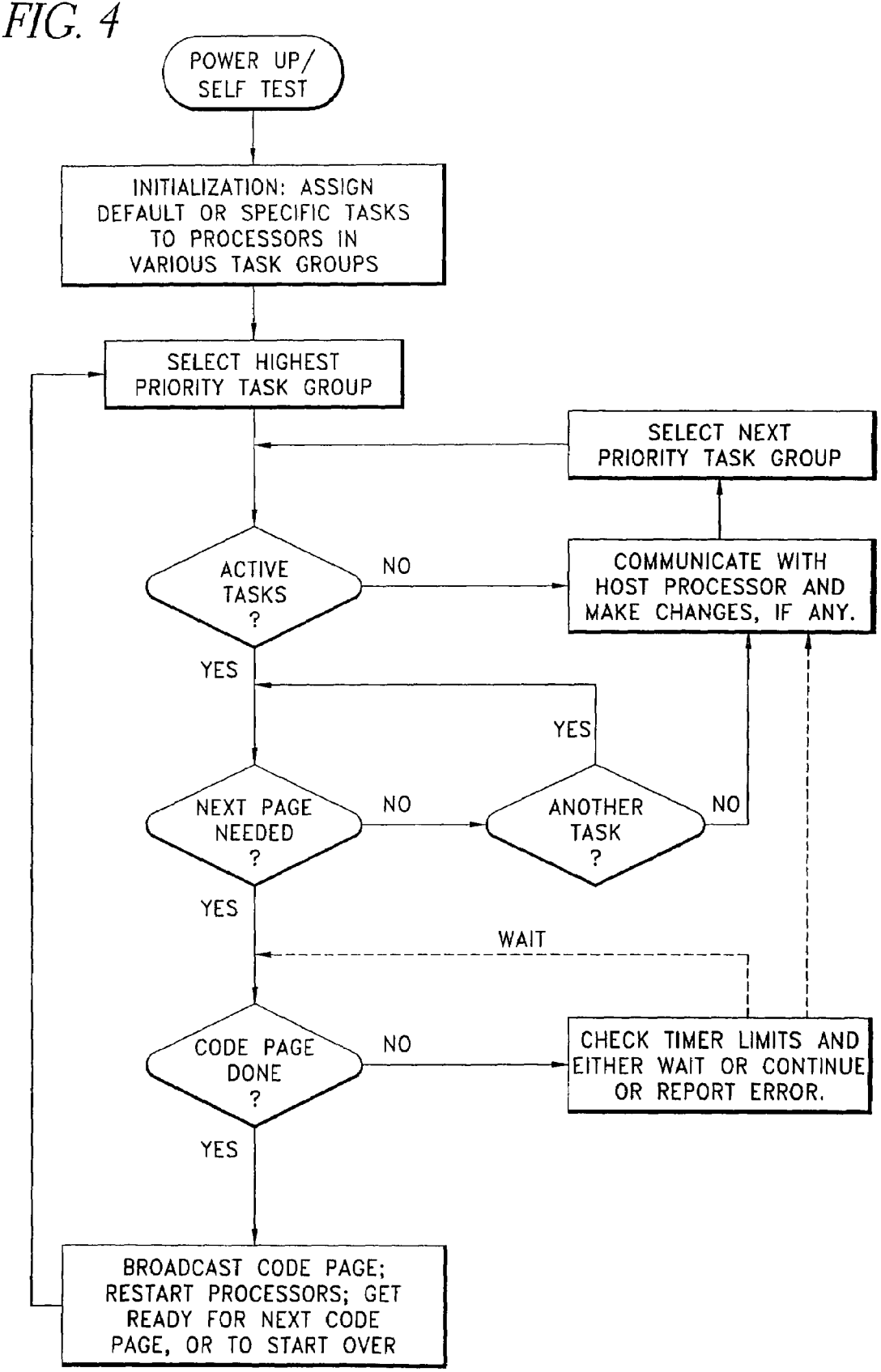
FIG. 4 illustrates one possible flow diagram for the Task Control Processor of FIG. 1.

A preferred way to handle the above issues is to use a software task scheduler and prioritizer 56 (hereinafter "task scheduler") to keep track of the task mix. As depicted in FIG. 1, the task control processor 44 may execute the task scheduler 56 from a local memory 57. Each task mix preferably consists of a fixed or a limited number (e.g., 8) of different tasks. Tasks are prioritized according to the real-time requirement of a particular task's data sets. For example, if one data set has to be revisited every 125 microseconds and another every 1 millisecond, the shorter time interval is assigned a higher priority. Under the control of the task scheduler 56, the task control processor sequences through the code pages associated with these tasks in a fixed order, as shown in FIG. 4. If all code pages have their execution lengths controlled, the timing can be handled by handshaking between the task control processor and the group of processors 32 that are running the particular code page.

Figure 5:
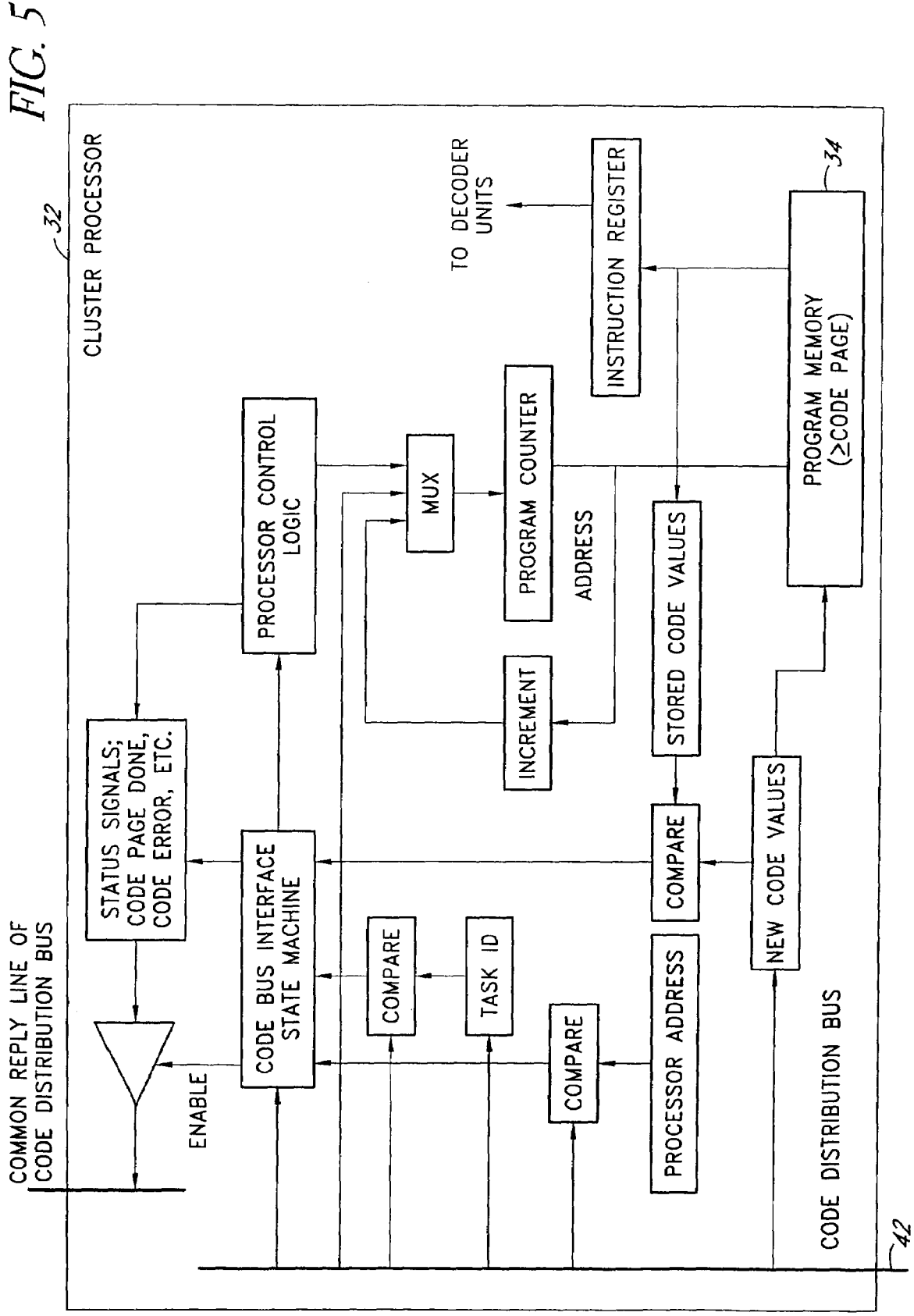
FIG. 5 illustrates details of a cluster processor's code bus interface according to one embodiment of the invention.

In one embodiment, each processor 32 is assigned an address (such as a table row and column position) via hardware so the task control processor 44 can identify and assign specific tasks to individual processors 32 (see FIG. 5). Initialization is preferably handled by the task control processor or through a scan chain interface. After initialization (during which all processors 32 are assigned an initial task ID), each processor 32 waits for its first code page to be loaded and a run command given. At this point, the task control processor starts on its first code page, and asks all processors 32 that will execute that code page if they are ready for a page swap (a time-out mechanism can be implemented to prevent system deadlock, e.g. during code debugging). When all of the processors 32 within the relevant task group are ready, the code page is loaded (broadcast) and the processors are directed to continue. The task control processor then moves on to the next code page (FIG. 4). Even though each processor in a task group executes a copy of the same code page, they may not all finish quite at the same time due to data dependent execution paths. The test for code page completion is thus a synchronizing mechanism in the preferred embodiment.

On special time boundaries, the task control processor may use an independent time source to check for overall timing. This time source may be associated with another task, and may involve a programmable counter which is tied to an independent timing source (e.g. a real-time clock). If the processors 32 are actually halted between code pages, the task control processor 44 may require access to a processor's run control mechanism.

Task Interface Features

In one embodiment, the code distribution bus structure is such that a common set of wires can be used either to transfer a command to a specific cluster processor 32 or to all cluster processors at once. A separate wire is used to specify when the bus is in command mode or in data mode. A bus command may consist of 3 fields: a command function, a processor address, and command data. Processor addresses can consist of a cluster address part, and a processor-within-cluster address part (like choosing a row and column in an array). A special address may be used to signal that all processors should be affected. The command function part signals an action to be performed (see below). The command data part provides additional information to go with the command function (such as a task ID value). The code distribution bus 42 may be wide enough to contain all of these command fields, and be sufficiently wide to transmit multiple instructions at one time. Each cluster processor 32 may have a state machine interface to recognize and execute commands that are addressed to it.

To support the forgoing features, the cluster processors 32, the task control processor 44, and the code distribution bus 42 preferably implement or support the following:

- A command to assign a task number to a selected processor 32 (e.g., to assign that processor to a task group). Each processor 32 may include a programmable task ID register for storing this number.
- At least one command for broadcasting instructions to processors 32 that have the same "task number." Preferably, a "burst" command is implemented that allows all instructions in a code page to be broadcast one after the other without stopping (once the mechanism is started), e.g. through a sequence such as: write_start, starting_address, instr1, instr2, . . . , instr_last, write_stop.
- A command to determine if all processors 32 in a particular task group have finished executing the current code page. For example, a task ID is put on the bus 42, and each processor's current task ID is compared with the one on the bus. If any processor 32 detects a match and is not yet ready for a new code page, that processor forces a common reply signal line (FIG. 5) to the false state.
- A command or sequence of commands by which the task control processor may alter a processor's state from "halted" or "suspended" to "running", or from "running" to "halted" or "suspended". In the former case, a method is thereby provided to notify a processor 32 when a code page is ready for execution. When a processor has finished executing a code page it may be desirable for it to execute a small piece of "framework" code that does not need to be reloaded with each code page change. The framework code maintains proper state between page changes.

The bus 42 may also include one or more commands to facilitate program memory testing. In one embodiment, test data (acting like a portion of a code page) is broadcast over the bus 42, and participating processors 32 (with associated logic) have the contents of their program memories 34 compared (word by word) with the broadcast test data, thereby permitting multiple program memories to be tested in parallel (FIG. 5). Error reporting can be handled in a manner similar to how code page execution completion is handled.

Software applications that are intended to execute on a cluster 30 of the type described above preferably have a single entry point, and are designed to either exit or to start over on a new set of data upon reaching a logical end point. Some real world applications, such as voice channel processing, never run out of data, so voice channel processing programs commonly process short bursts of voice data and then start over on the next burst. Other real world applications that run continuously include wireless base station control, multi-media servers, and network switches.

Subdividing Programs into Code Pages

Figure 3:
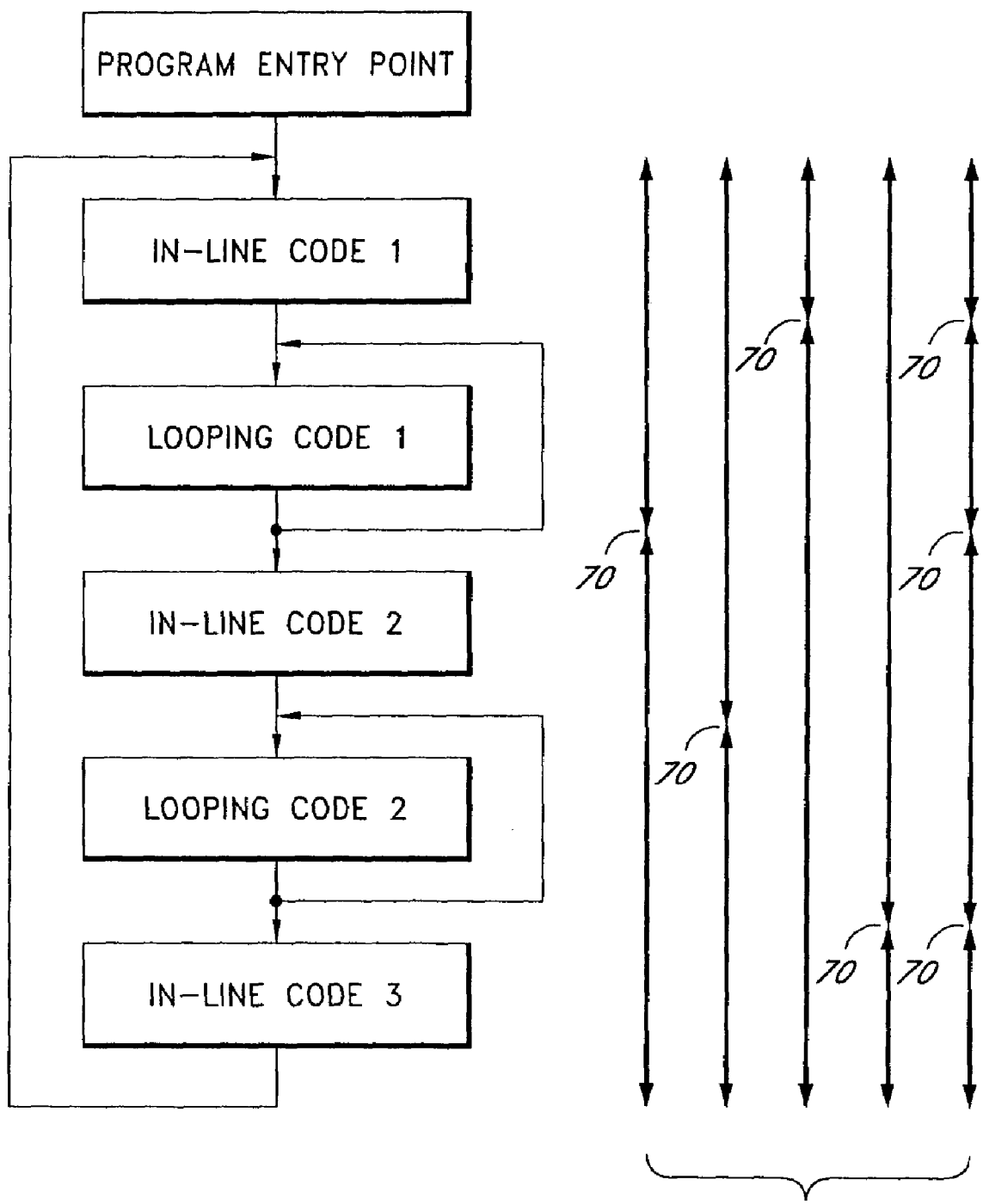
FIG. 3 illustrates example boundary locations for dividing a code sequence into code pages.

FIG. 3 is a flow diagram of a typical software application showing possible code page boundaries 70. These boundaries may be selected by a designer based on an inspection of the compiled application code, or may be selected by an executable program that selects the boundaries based on a set of rules. The boundaries are preferably selected such that every code page may be loaded in its entirety into the local program memory 34 of a processor 32. In the example shown in FIG. 3, it is assumed that all of the processors 32 within the relevant cluster 30 have equal-size program memories 34 of 2K (2048) instructions (words), or 8K bytes if the instructions are 4 bytes each.

In this example, there are 3 blocks of in-line code and 2 blocks of looping code (in general there will be many more blocks of each type). The application can be subdivided into code pages of up to 2K words in several possible ways, as shown in FIG. 3. The most effective subdivision is to have the minimum number of code pages without breaking a significant block of looping code. Each code page preferably executes only once from beginning to the start-over point. A loop can optionally be subdivided into two smaller loops or unrolled into straight code if a suitable code page boundary cannot be found. Because the looping code typically uses up many more processor cycles during execution than is needed to load the code pages, the loading events do not significantly impair performance. This is analogous to the cache miss phenomenon, and resulting performance loss, in a more traditional computer architecture.

As mentioned above, the processors 32 of a cluster 30 may be divided into two or more task groups, each of which executes a different software application or task. In such cases, the task control processor broadcasts code pages over the bus 42 to all processors 32 within a task group, such that the program memories 34 of these processors are loaded in parallel.

Code pages may be sorted according to the order in which they should be loaded by the task control processor. The code page ordering is preferably chosen in advance with the aid of software performance analysis tools and a task mix simulator, taking into consideration timing constraints for each task. The resulting task schedule information may be kept as tables (not shown) in task control processor's local memory 57. This schedule information may be loaded from the host processor 36, or via another agent such as a boundary scan interface, during the power up sequence.

Voice Channel Processing

As an example of how the current architecture may be applied to a real application, consider how voice channels may be processed. There are several standards and proprietary methods for processing voice channels. Let a task consist of a group of standard voice processing algorithms (as programs and code pages). Such a task may, for example, perform voice activity detection, silence suppression, echo cancellation, and/or voice compression, and may run continuously on each processor 32 within a task group. There can be several such tasks, each of which may differ in some respects, such as the amount of voice compression provided or the length of echo tail processed. Different tasks may be assigned to different task groups within the same cluster 30, or spread across multiple clusters.

In the preferred embodiment, a single cluster processor 32 is restricted to one task at a time, and depending upon the capability of each processor 32, one or more voice channels can be assigned to it (via communication with a host processor 36). Voice channel assignment to processors is preferably done by prior system analysis and modeling. Small changes can optionally be handled dynamically. Voice data samples are fed to each processor 32 through the shared cluster global memory 40 at regular intervals by a higher-level processor 38. Some intervals may be as short as a few multiples of the basic telephony sample period of 125 microseconds, and some may be 5 to 30 milliseconds, depending upon various voice compression algorithms. Code pages are dispatched to the processors 32 in a task group in such a way that incoming voice samples are consumed at their incoming rate. Modified voice sample outputs are also produced at the same rate, all through the shared cluster global memory 40.

Hierarchical Bus Structure

FIG. 6 illustrates one example how multiple clusters 30 of the type described above may be interconnected within an integrated circuit device. In this example, the clusters 30 are arranged within a 2-level hierarchy with one root cluster 30 and J leaf clusters. The root cluster contains K processors 32, and each leaf cluster contains L processors 32.

All processors 32 of all clusters 30 in this example are coupled to a common code distribution bus 42, and are managed (receive code pages, etc.) by a common task control processor 44. Multiple code distribution bus/task control processor pairs may alternately be provided, each of which services a different cluster 30 or group of clusters.

Each cluster 30 in the hierarchy includes a bus cycle assignment unit 60 that controls accesses to that cluster's shared memory 40. The shared memory 40 of the root cluster may be omitted. Each leaf level processor 32 can only access the shared memory 40 within its respective cluster 30, and not other shared memories, in the preferred embodiment. Each root level processor, however, can access the shared memory 40 of the root cluster 30 (if provided) and the shared memories 40 of the leaf clusters.

Each bus cycle assignment unit 60 controls memory accesses by allocating timeslots on its respective bus 62 to specific processors 32. The timeslots may be allocated to processors according to a round robin protocol, although other types of assignment protocols may alternatively be used. Each leaf-level bus cycle assignment unit 60 allocates timeslots to L leaf processors 32 as well as processing requests from the K root processors 32, whose time slots are allocated by the root level bus cycle assignment unit. With this hierarchical arrangement, the root-level processors 32 may, for example, be used primarily to load input datasets into, and to read output datasets from, the shared memories 40 of the leaf clusters. The processors 32 of the leaf clusters 30, on the other hand, may execute one or more signal processing tasks (echo cancellation, voice compression, etc.).

The preferred number of processors (L) in a leaf cluster 30 depends on how much contention can be tolerated in the global memories 40. For a regular array, L might be about the square root of N, where N is the total number of processors 32 in the leaf clusters. There is also a dependence on the lengths of the code distribution bus 32 and memory data and address busses. These buses should be short enough (i.e., lightly loaded) to support single clock cycle data transfer. However, multiple clocks per transfer are also possible. Typical ranges for J, K, and L are as follows L=4–10; K=3–6, and J=4–10.

Additional details of the hierarchical bus structure depicted in FIG. 6 are disclosed in a concurrently-filed U.S. patent application by Hobson et al. titled HIERARCHICAL BUS STRUCTURE AND MEMORY ACCESS PROTOCOL FOR MULTIPROCESSOR COMMUNICATIONS (application Ser. No. 10/369,340, filed Feb. 18, 2003), and by corresponding U.S. provisional application No. 60/358,133, filed, Feb. 19, 2002, the disclosures of which are hereby incorporated by reference.

Although this invention has been described in terms of certain preferred embodiments and applications, other embodiments and applications that are apparent to those of ordinary skill in the art, including embodiments and applications which do not provide all of the features and advantages set forth herein, are also within the scope of this invention. Accordingly, the scope of the present invention is intended to be defined only by reference to the appended claims.

What is claimed is:

1. A method of executing a task in parallel on a plurality of processors, the method comprising:
   (a) storing a sequence of code pages of said task in a common program memory;

(b) broadcasting a current code page of said sequence of code pages on a code distribution bus to concurrently load the current code page into a plurality of local memories of the plurality of processors;

(c) monitoring the plurality of processors to determine whether all of the processors have completed execution of the current code page from their corresponding local memories; and (d) after all of the processors have finished executing the current code page, repeating (b) and (c) with a next sequential code page of said sequence treated as the current code page, at least until all code pages of the sequence have been executed;

whereby each code page of the sequence is executed in parallel by the plurality of processors.

2. The method of claim 1, wherein the method comprises processing a different respective dataset with each of the plurality of processors.

3. The method of claim 1, wherein the task is a voice processing task, and the method comprises processing a plurality of voice data streams in parallel with the plurality of processors.

4. The method of claim 1, wherein each processor executes the current code page from a different respective local memory.

5. The method of claim 1, wherein each of the local memories is shared by two of the processors.

6. The method of claim 1, wherein each code page of said sequence has a size of less than 4K instruction words.

7. The method of claim 1, wherein broadcasts of code pages on the code distribution bus in step (b) are interleaved with broadcasts of code pages of a second task to a second plurality of processors.

8. The method of claim 1, wherein the method is performed entirely within an integrated circuit.

9. The method of claim 1, wherein steps (b)–(d) are performed by a task control processor that executes a control program.

* * * * *